Jan. 23, 1945.　　　P. W. THORNHILL　　　2,367,977
SHOCK ABSORBER
Filed April 29, 1942

INVENTOR
P. W. THORNHILL
By Stevens and Davis
ATTY's.

Patented Jan. 23, 1945

2,367,977

UNITED STATES PATENT OFFICE 2,367,977

SHOCK ABSORBER

Peter Warborn Thornhill, Leamington Spa, England, assignor to John Henry Onions, Coventry, England Application April 29, 1942, Serial No. 441,013
In Great Britain April 8, 1941

10 Claims. (Cl. 267—64)

This invention relates to shock absorbers of the type in which liquid is used for damping relative movement of a pair of members, usually a cylinder and a plunger telescopically mounted therein, resilient means, such as a quantity of compressed air or other gas, being provided to sustain the load which is normally carried by the shock absorber due, for instance, to the weight of the vehicle body or equivalent which the shock absorber serves to support.

The invention has for its object to provide a simplified method of filling and sealing telescopic shock absorbers in such a manner that servicing during use is substantially eliminated.

According to the invention, a method of charging a shock absorber with gas under pressure consists in inserting during assembly means adapted to generate gas, then sealing the shock absorber and then allowing or causing gas to be generated by the said means.

Further the improved method may consist in inserting into the shock absorber during assembly a substance which evolves gas on heating, then sealing the shock absorber and then heating the substance or allowing it to acquire heat so as to generate the gas under pressure within the sealed internal space of the shock absorber.

As a further aspect, the improved method may be carried out by inserting during assembly a plurality of chemical substances capable of reacting to produce gas, said chemical substances being isolated from one another, then sealing the shock absorber and then causing the chemical substances to be brought into contact with one another so that they react and produce gas under pressure. If desired the chemical substances may be isolated from one another by a partition or wall which is punctured or otherwise rendered ineffective after the shock absorber has been sealed.

According to another feature of the invention there is provided a telescopic shock absorber containing gas under pressure to support a normal axial load, and a quantity of liquid for damping movement of the parts, wherein the gas pressure is generated within the shock absorber, subsequent to the sealing of said shock absorber, owing to evaporation or chemical action of a substance or substances inserted in the shock absorber during assembly.

The gas may be generated in one or more of the normal working spaces of the shock absorber, or alternatively a special chamber may be connected with said space for the purpose of holding the chemical or chemicals; this is especially desirable where the gas is evolved by the application of heat, as this enables the shock absorber proper to be maintained relatively cool during the heating process. Where two or more substances are used to react for producing the gas, but are initially kept apart until after the shock absorber has been sealed, one or each of said substances may be contained within a sac, capsule or other container which is arranged to be burst or broken when it is desired to produce the gas.

The following examples serve to show the manner in which the invention may be carried into effect.

Frozen carbon dioxide can be inserted into the working space of the shock absorber immediately prior to sealing, so that as the carbon dioxide evaporates it generates the requisite gas pressure within the shock absorber. Where the shock absorber is sealed by welding or soldering an end closure member or a stopper in position, steps would normally be taken to keep the body of the shock absorber cool so as to avoid premature evaporation and loss of the carbon dioxide. If desired, other gases may be inserted in liquid form and allowed to evaporate after the shock absorber has been sealed.

Hydrogen is produced when materials such as sodium, sodium amalgam or calcium are brought into contact with water; in a similar manner the action of water on calcium carbide ($CaC_2$) results in the generation of acetylene. The sodium, sodium amalgam, calcium or calcium carbide is inserted in the shock absorber in a loose form or is secured to or within any suitable part of the structure, or perhaps within a water soluble container or cell. The water is disposed within a sac, capsule or the like which may be anchored at a position where movement of the shock absorber parts causes the said sac, capsule or the like to be burst, punctured, broken or otherwise treated so as to liberate the water. The sac or equivalent can be secured to the end of the shock absorber where the gas is desired, a point formed on a floating piston, longitudinal damping valve control rod or other movable part of the shock absorber being arranged to puncture or break the sac or equivalent and liberate the water when the shock absorber is fully compressed for the first time. It may, of course, be necessary to take steps to avoid corrosion or other harmful effects produced by the chemical or chemicals which may be left after the gas has been produced; for instance, the sodium and calcium reactions both result in the production of alkali, and therefore it would probably be considered undesirable to use aluminum at least for the internal parts of the shock absorber. Certain or all of the parts might be plated or coated to preserve them against such corrosion.

In another method of carrying out the invention, a chemical substance is heated to generate a gas; thus when potassium nitrate (KNO₃) is heated it produces oxygen. Such a chemical compound may be inserted into the shock absorber during assembly, so that when the shock absorber has been sealed, heating the chemical frees the gas, which latter accumulates within the appropriate working space or spaces of the shock absorber and creates the required fluid pressure. The chemical can be disposed within a container which projects from the shock absorber proper, conveniently at the extremity of a tubular neck so that the container may be heated to the requisite temperature without unduly heating the shock absorber itself. The container may be formed upon, or secured to, one of the end plugs of the shock absorber. The actual pressure which is required depends, of course, upon the design of the shock absorber and the load which it is intended to carry, but it is expected that a normal pressure of the order of 750 pounds per square inch will be obtainable by the present method.

The invention is illustrated by way of example in the accompanying diagrammatic drawing, in which.

Figure 1:
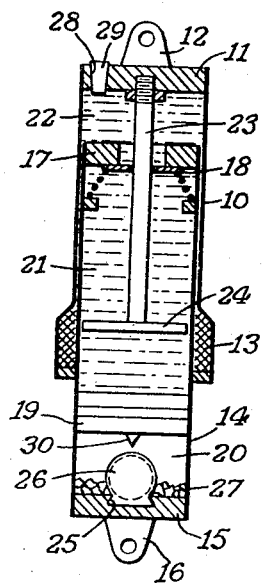
Figure 1 is a sectional elevation of a telescopic shock absorber in its fully assembled condition, but prior to the generation of the gas.
Figure 2:
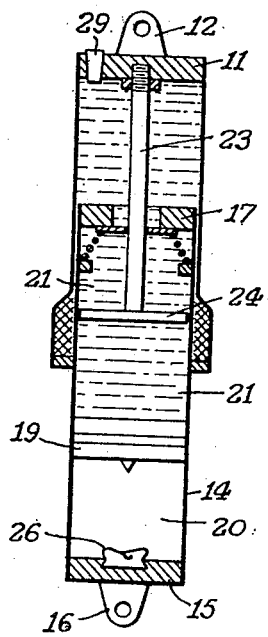
Figure 2 is a view, similar to Figure 1, but showing the shock absorber in its operative condition.

Referring firstly to Figures 1 and 2, the shock absorber shown comprises briefly a cylinder tube 10 having an upper closure member 11 provided with an attachment lug 12, a packing gland 13 being arranged to engage slidably in a fluid-tight manner with the exterior of a plunger tube 14. This has a lower closure member 15 with an attachment lug 16, while its upper end carries a piston head 17 incorporating a damping valve 18 of any convenient construction. A floating piston 19 slidable in a fluid-tight manner within the plunger tube 14 serves as a partition between gas in the space 20 at the lower end of the plunger tube 14, and damping liquid which fills the remaining space 21 within the plunger as well as the space 22 within the cylinder 10. An axial stem 23 extends from the upper closure member 11, through the piston head 17 and terminates in a stem head 24 disposed within the space 21, said stem head 24 being a loose fit in the plunger tube 14 so as to retard the flow of liquid past it.

The closure member 15 is formed with an undercut recess 25 for the reception of a rubber or like sac 26 having a thickened bead arranged to fit snugly into the recess 25. The sac 26 contains a chemical substance, such as water, while the second substance, such as sodium amalgam, is disposed within the plunger tube 14 and is indicated at 27.

When the parts have been assembled as shown, the requisite quantity of damping liquid is inserted, through an opening 28 in the upper closure member 11, after which said opening is sealed by a plug 29. The latter is secured in position in a more or less permanent manner, such as by welding, soldering or the like, thus preventing unauthorised tampering with the contents and internal parts of the shock absorber.

By shortening the shock absorber as far as possible, the floating piston 19 is forced against the sac 26, thus bursting the latter, the action conveniently being rendered more certain by the provision of a point 30 upon said floating piston. The chemical substances thus intermingle, and by reacting together, generate sufficient gas to produce the requisite pressure within the shock absorber.

Figure 3:
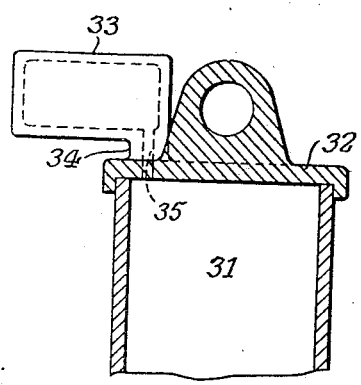
Figure 3 is a fragmentary sectional elevation of an end closure member incorporating a container suitable for those chemicals which require to be heated.

Figure 3 shows an arrangement for use where the chemical substance requires heating in order to generate the gas. The gas space and the adjacent end closure member are indicated at 31 and 32 respectively. A container 33 formed integrally with the closure member 32 is connected therewith by a neck portion 34 having a relatively small cross sectional area with a view to reducing the conduction of heat from the container 33 to the end closure member 32 and thence to the other parts of the shock absorber proper. A narrow passage 35 extends through the neck 34 so as to conduct the generated gas into the gas space 31. When the shock absorber is assembled, the chemical is inserted in the container 33 and the shock absorber is sealed up, after having been charged with damping liquid. The container 33 is subsequently heated, say by a blow lamp, to generate the gas pressure, the telescopic tubes in the meantime being kept cool to prevent damage to the working parts by overheating them.

The improved shock absorbers according to the invention, employing chemical action to produce the gas, have the advantage that they may be packed in a small space until required for installation, and then they can be charged without requiring any special apparatus such as air pumps or gas cylinders. When a considerable period is likely to elapse between the assembly and the installation of the shock absorber, the chemical substance or substances should of course be chosen so as to avoid deterioration.

What I claim is:

1. A shock absorbing suspension device comprising in combination, a cylinder, a hollow plunger slidable therein, a sealed variable volume space within the cylinder and plunger, damping liquid in said space, a plurality of chemical reagents also within said space, said reagents being mutually reactive to generate a sufficient quantity of gas under pressure to support resiliently the normal load on the shock absorber, isolating means for maintaining said reagents initially out of contact with one another, and means operable by relative movement of the plunger and cylinder of the shock absorber to render the isolating means ineffective.

2. A telescopic shock absorber as claimed in claim 1, wherein the chemical substances comprise sodium amalgam and water, respectively.

3. A telescopic shock absorber as claimed in claim 1, wherein the chemical substances comprise calcium and water, respectively.

4. A telescopic shock absorber as claimed in claim 1, wherein the chemical substances comprise calcium carbide (CaC₂) and water, respectively.

5. A shock absorbing suspension device comprising in combination, a cylinder, a hollow plunger slidable therein, a sealed variable volume space within the cylinder and plunger, damping liquid in said space, a readily breakable container disposed within said space, a quantity of chemical reagent within said container, a quantity of another chemical reagent disposed within said variable volume working space but outside said container, said reagents being mutually reactive to generate a sufficient quantity of gas under pressure to support resiliently the normal load on the shock absorber, and means operable by relative movement of the plunger and cylinder of the shock absorber to break the container and allow the chemical reagents to react with one another.

6. A shock absorbing suspension device comprising in combination, a cylinder, a hollow plunger slidable therein, a sealed variable volume space within the cylinder and plunger, damping liquid in said space, a readily breakable container disposed within the interior of the plunger, a quantity of chemical reagent within said container, a quantity of another chemical reagent disposed within the plunger but outside the container, said reagents being mutually reactive to generate a sufficient quantity of gas under pressure to support resiliently the normal load on the shock absorber, and means which are disposed within the plunger but are operable by relative movement of the cylinder and plunger to break the container and allow the chemical reagents to react with one another.

7. A shock absorbing suspension device comprising in combination, a cylinder, a hollow plunger slidable therein, a variable volume space within the cylinder and plunger, damping liquid in said space, a floating piston freely slidable within the plunger and arranged to act as a partition separating the plunger into a space for damping liquid and a space for gas under pressure, a readily breakable container disposed in said gas space, a quantity of chemical reagent within said container, and a quantity of another chemical reagent disposed within the gas space but outside the container, said reagents being mutually reactive to generate a sufficient quantity of gas under pressure to support resiliently the normal load on the shock absorber, the floating piston being arranged to cush the container when the shock absorber is charged with liquid and is shortened beyond a predetermined extent, thereby allowing the chemical reagents to react with one another and generate compressed gas for rendering the shock absorber operative.

8. A shock absorbing suspension device according to claim 7, in which a projection is provided upon the floating piston and is arranged in alignment with the container so as to puncture the latter when the shock absorber is shortened.

9. A shock absorbing suspension device according to claim 7, in which the readily breakable container comprises a flexible sac filled with liquid reagent.

10. A shock absorbing suspension device accoording to claim 7, in which the readily breakable container is secured to the interior of the end wall of the plunger.

PETER WARBORN THORNHILL.